US012597424B2

(12) United States Patent
Zhu et al.

(10) Patent No.: US 12,597,424 B2
(45) Date of Patent: Apr. 7, 2026

(54) METHOD AND APPARATUS FOR DETERMINING SKILL FIELD OF DIALOGUE TEXT

(71) Applicant: AI SPEECH CO., LTD., Suzhou (CN)

(72) Inventors: Chengya Zhu, Suzhou (CN); Shuai Fan, Suzhou (CN); Chun Li, Suzhou (CN); Weisi Shi, Suzhou (CN)

(73) Assignee: AI SPEECH CO., LTD., Suzhou (CN)

( * ) Notice: Subject to any disclaimer, the term of this patent is extended or adjusted under 35 U.S.C. 154(b) by 504 days.

(21) Appl. No.: 17/912,112

(22) PCT Filed: Nov. 17, 2020

(86) PCT No.: PCT/CN2020/129342
§ 371 (c)(1),
(2) Date: Sep. 16, 2022

(87) PCT Pub. No.: WO2021/184794
PCT Pub. Date: Sep. 23, 2021

(65) Prior Publication Data
US 2023/0133146 A1      May 4, 2023

(30) Foreign Application Priority Data
Mar. 18, 2020      (CN) .......................... 202010193878.7

(51) Int. Cl.
*G10L 15/22*      (2006.01)
*G06F 40/30*      (2020.01)
(Continued)

(52) U.S. Cl.
CPC .......... *G10L 15/22* (2013.01); *G10L 15/1815* (2013.01)

(58) Field of Classification Search
CPC ................. G10L 15/22; G10L 15/1815; G10L 2015/223; G10L 2015/228; G06F 40/279; G06F 40/35; G06F 40/30
See application file for complete search history.

(56) References Cited

U.S. PATENT DOCUMENTS 7,143,353 B2 * 11/2006 McGee ................ H04N 21/426
                                                  715/721
8,234,284 B2 * 7/2012 Shao ........................ G06F 16/68
                                                  707/723
(Continued)

FOREIGN PATENT DOCUMENTS

CN      108920497 A      11/2018
CN      109783735 A * 5/2019 ......... G06F 12/0886
(Continued)

OTHER PUBLICATIONS

C. Xiao, D. Zheng, Y. Yang and G. Shao, "Automatic Domain-Ontology Relation Extraction from Semi-structured Texts," 2009 International Conference on Asian Language Processing, Singapore, 2009, pp. 211-216 (Year: 2009).*
(Continued)

*Primary Examiner* — Douglas Godbold
*Assistant Examiner* — Mulugeta Tuji Dugda
(74) *Attorney, Agent, or Firm* — Harness, Dickey & Pierce, P.L.C.

(57)      ABSTRACT

Disclosed is a method for determining a skill field of a dialogue text including determining a skill field hit by a dialogue text input by a user, and a name semantic slot and a character semantic slot in the skill field; when the dialogue text hits a first skill field, determining whether the name semantic slot and the character semantic slot match according to a knowledge base of the first skill field; determining, if not matched, whether the name semantic slot and the character semantic slot match according to a knowledge (Continued)

base of a second skill field; and determining, if matched, the second skill field as the skill field of the dialogue text. Also provided is an apparatus for determining a skill field of a dialogue text. The error rate of field classification is reduced, and the skill field can be hit by the user's voice dialogue more accurately.

5 Claims, 2 Drawing Sheets

(51) Int. Cl.
*G06F 40/35* (2020.01)
*G10L 15/18* (2013.01)

(56) References Cited

U.S. PATENT DOCUMENTS

| | | | | |
|---|---|---|---|---|
| 9,466,295 | B2 | 10/2016 | Zhang | |
| 10,276,170 | B2 * | 4/2019 | Gruber | G06F 16/9537 |
| 10,453,117 | B1 * | 10/2019 | Reavely | G06N 5/027 |
| 2019/0147052 | A1 * | 5/2019 | Lu | G10L 15/22 707/722 |

FOREIGN PATENT DOCUMENTS

| | | | | | |
|---|---|---|---|---|---|
| CN | 109918673 | A | * | 6/2019 | ............ G06F 40/20 |
| CN | 110008314 | A | | 7/2019 | |
| CN | 110543633 | A | | 12/2019 | |
| CN | 110808051 | A | | 2/2020 | |
| CN | 111061908 | A | * | 4/2020 | .......... G06F 16/635 |
| CN | 111414764 | A | | 7/2020 | |
| JP | 2017-224155 | A | | 12/2017 | |

OTHER PUBLICATIONS

International Search Report (English and Chinese) and Written Opinion of the International Searching Authority (Chinese) issued in PCT/CN2020/129342, mailed Feb. 19, 2021; ISA/CN.
First Notice of Reasons for Refusal of corresponding JP Application No. 2022-555166 with English translation.
Second Notice of Reasons for Refusal of corresponding JP Application No. 2022-555166 with English translation.
Communication Pursuant to Article 94(3) EPC issued by the EPO on Jul. 11, 2024 in corresponding EP Application No. 20925821. 9-1203.
Extended European Search Report issued by the EPO on Jul. 12, 2023 in corresponding EP Application No. 20925821.9-1203.

* cited by examiner

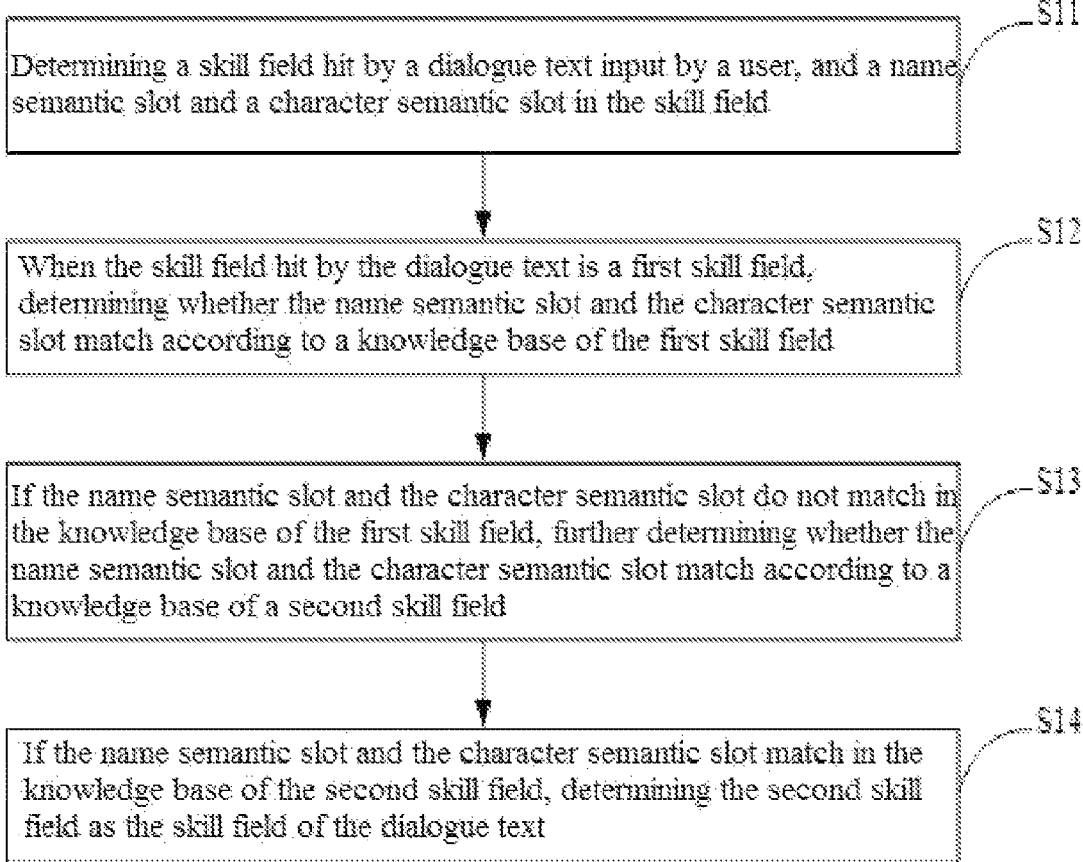

Determining a skill field hit by a dialogue text input by a user, and a name semantic slot and a character semantic slot in the skill field _S11

When the skill field hit by the dialogue text is a first skill field, determining whether the name semantic slot and the character semantic slot match according to a knowledge base of the first skill field _S12

If the name semantic slot and the character semantic slot do not match in the knowledge base of the first skill field, further determining whether the name semantic slot and the character semantic slot match according to a knowledge base of a second skill field _S13

If the name semantic slot and the character semantic slot match in the knowledge base of the second skill field, determining the second skill field as the skill field of the dialogue text _S14

FIG. 1

METHOD AND APPARATUS FOR DETERMINING SKILL FIELD OF DIALOGUE TEXT

CROSS-REFERENCE TO RELATED APPLICATIONS

This application is a U.S. National Phase Application under 35 U.S.C. 371 of International Application No. PCT/CN2020/129342, filed on Nov. 17, 2020, which claims the benefit of Chinese Patent Application No. 202010193878.7, filed on Mar. 18, 2020. The entire disclosures of the above applications are incorporated herein by reference.

TECHNICAL FIELD

The present invention relates to the field of intelligent speech, in particular to a method and apparatus for determining a skill field of a dialogue text.

BACKGROUND

During intelligent voice interaction, in order to ensure a user's dialogue to be responded correctly, a corresponding skill hit by the user's dialogue will be determined to enter a corresponding skill field to reply to the user. A regularization-based matching method is often used for determining the skill field. In the process of classifying the skill field, for example, a TV voice product includes a film skill and a television skill, and the rule used is generally "Play *'s *". For example, for "Play Andy Lau's Love You For Ten Thousand Years", the task-based skill parsing result is that, the filmmaker: Andy Lau, and the title of the film: Love You For Ten Thousand Years. For "Play Teresa Teng's Tianmimi", the task-based skill parsing result is that, the filmmaker: Teresa Teng, and the title of the film: Tianmimi.

However, the rule for "Playing *'s*" also applies to a music skill. For "Play Andy Lau's Love You For Ten Thousand Years", the task-based skill music parsing result is that, the song name: Love You For Ten Thousand Years, and the singer's name: Andy Lau. For "Play Teresa Teng's Tianmimi", the task-based skill music parsing result is that, the song name: Tianmimi, and the singer name: Teresa Teng.

In the process of realizing the present invention, the inventor found that at least the following problems exist in the related art:

In the case that two skills have the same parsing confidence for the same speech, a default preferential skill will be used to reply to the user. For example, in a TV voice product, the film and television skill will take precedence over the music skill. For the dialogue of "Play Teresa Teng's Tianmimi", the TV voice product will give priority to the film and television skill. If Teresa Teng is not listed in the "Filmmaker" thesaurus or Tianmimi is not listed in the "Title" thesaurus, the music skill will be re-selected. However, the contents of the parsed semantic slots "Teresa Teng" and "Tianmimi" exist in the thesaurus of "Filmmaker" and "Title" respectively, but the corresponding semantic slots are not associated, resulting in a wrong hit in the skill field. The dialogue that should fall into the music skill falls into the film and television skill, and the movie Tianmimi starred by Teresa Teng cannot be found, resulting in poor user experience.

SUMMARY OF THE INVENTION

In order to at least solve the problem of hitting wrong skill field due to not making correlation between semantic slots in the prior art, in a first aspect, an embodiment of the present invention provides a method for determining a skill field of a dialogue text. The method includes:

determining a skill field hit by a dialogue text input by a user, and determining a name semantic slot and a character semantic slot in the skill field;

determining whether the name semantic slot and the character semantic slot match according to a knowledge base of the first skill field when the skill field hit by the dialogue text is a first skill field;

further determining whether the name semantic slot and the character semantic slot match according to a knowledge base of a second skill field if the name semantic slot and the character semantic slot do not match in the knowledge base of the first skill field; and determining the second skill field as the skill field of the dialogue text if the name semantic slot and the character semantic slot match in the knowledge base of the second skill field.

In a second aspect, an embodiment of the present invention provides an apparatus for determining a skill field of a dialogue text. The apparatus includes:

an information determining program module configured to determine a skill field hit by a dialogue text input by a user, and a name semantic slot and a character semantic slot in the skill field;

a first matching program module configured to determine whether the name semantic slot and the character semantic slot match according to a knowledge base of the first skill field when the skill field hit by the dialogue text is a first skill field;

a second matching program module configured to further determine whether the name semantic slot and the character semantic slot match according to a knowledge base of a second skill field if the name semantic slot and the character semantic slot do not match in the knowledge base of the first skill field; and a skill field determining program module configured to determine the second skill field as the skill field of the dialogue text if the name semantic slot and the character semantic slot match in the knowledge base of the second skill field.

In a third aspect, an electronic device is provided, including: at least one processor, and a memory communicatively connected to the at least one processor, in which the memory stores instructions executable by the at least one processor, the instructions being executed by the at least one processor to enable the at least one processor to perform the steps of the method for determining a skill field of a dialog text according to any embodiment of the present invention.

In a fourth aspect, an embodiment of the present invention provides a storage medium having a computer program stored therein, in which the program is executed by a processor to perform the steps of the method for determining a skill field of a dialogue text according to any embodiment of the present invention.

The beneficial effects of the embodiments of the present invention are that an correlation between semantic slots is established, the error rate of field classification is reduced, the skill field can be hit by the user's voice dialogue more accurately, and the user experience is improved.

BRIEF DESCRIPTION OF THE DRAWINGS

In order to illustrate the technical solutions of the embodiments of the present disclosure more clearly, a brief description of the accompanying drawings used in the description of the embodiments will be given as follows. Obviously, the accompanying drawings are some embodiments of the present disclosure, and those skilled in the art can also obtain other drawings based on these drawings without any creative effort.

FIG. 1 is a flowchart of a method for determining a skill field of a dialogue text according to an embodiment of the present invention;

DETAILED DESCRIPTION OF THE EMBODIMENTS

Figure 2:
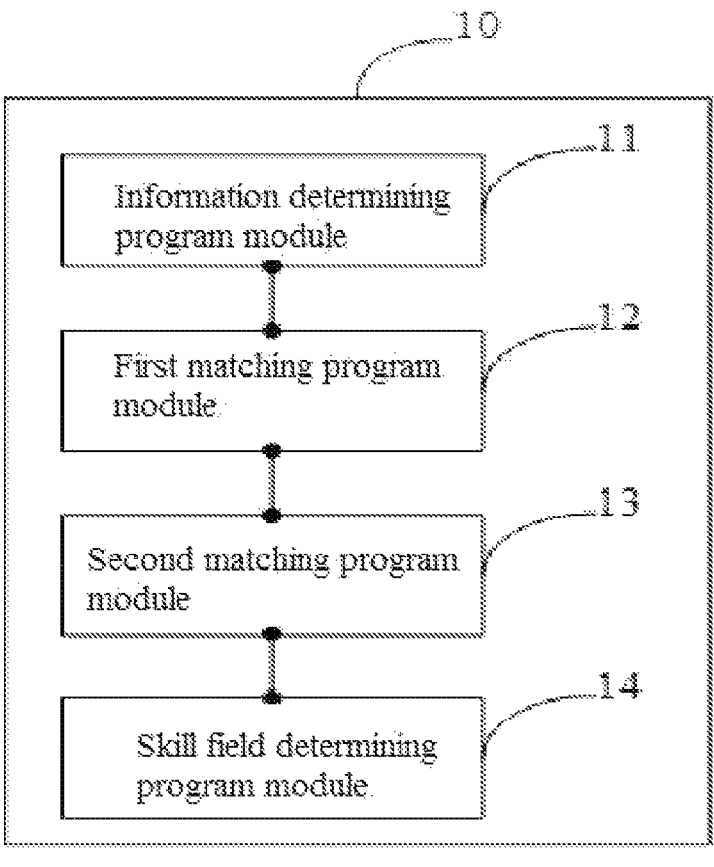
FIG. 2 is a schematic structural diagram of an apparatus for determining a skill field of a dialogue text according to an embodiment of the present invention.

In order to make the objectives, technical solutions and advantages of the embodiments of the present disclosure clearer, the technical solutions in the embodiments of the present disclosure will be described clearly and completely below with reference to the accompanying drawings in the embodiments of the present disclosure. Obviously, only some but not all embodiments of the present disclosure have been described. All other embodiments obtained by those skilled in the art based on these embodiments without creative efforts shall fall within the protection scope of the present disclosure.

An embodiment of the present invention provides a method for determining a skill field of a dialogue text, which is applied to an electronic device. The electronic device may be a smart TV, a smart phone, a smart speaker, a smart on-board device, a smart screen, etc., which is not limited in the present invention.

FIG. 1 shows a flowchart of a method for determining a skill field of a dialogue text according to an embodiment of the present invention. The method includes the following steps.

In S11, the electronic device determines a skill field hit by a dialogue text input by a user, and determines a name semantic slot and a character semantic slot in the skill field.

In S12, when the skill field hit by the dialogue text is a first skill field, the electronic device determines whether the name semantic slot and the character semantic slot match according to a knowledge base of the first skill field.

In S13, if the name semantic slot and the character semantic slot do not match in the knowledge base of the first skill field, the electronic device further determines whether the name semantic slot and the character semantic slot match according to a knowledge base of a second skill field.

In S14, if the name semantic slot and the character semantic slot match in the knowledge base of the second skill field, the electronic device determines the second skill field as the skill field of the dialogue text.

In this embodiment, although the corresponding items in the thesaurus of "title" or of "filmmaker" in the film and television skill are directly deleted, semantic parsing may fail when "title" or "filmmaker" is actually specified.

In order to solve these defects, a knowledge base in a film and television field and a knowledge base in a music field are established in advance. For example, in the knowledge base of the film and television field, all the corresponding "filmmakers" can be found by "titles". For example, for the title of the movie "Tianmimi", the corresponding filmmakers are: Peter Chan, Maggie Cheung, Leon Lai Ming, and Eric Tsang. In the "filmmakers" thesaurus, not only the actors' information, but also the directors' information can be included.

Similarly, in the knowledge base of the music field, a list of all the corresponding "singer names" can be found by "song names". For example, for the song name "Tianmimi", the corresponding singer names include Teresa Teng, Andrew Chow, and Fiona Sit.

For step S11, an electronic device (e.g., a smart TV) is generally equipped with a TV voice product which includes a film and television skill and a music skill, with the film and television skill having a higher priority than the music skill. In the case that the two skills have the same parsing confidence, the film and television skill takes precedence.

The film and television skill and the music skill are also included in a smart dialogue voice product that a smartphone generally carries, with the music skill having a higher priority than the film and television skill. When the two skills have the same parsing confidence, the music skill takes precedence.

Taking a smart TV as an example, when a user says "Play Teresa Teng's Tianmimi" to the smart TV, a task-based skill semantic service and a knowledge-based skill service are scheduled in parallel. The user's speech will hit which skill field is determined through the task-based skill semantic service. For example, the "film and television field" and the "music field" may be hit. A film and television name semantic slot "Tianmimi" and a filmmaker semantic slot "Teresa Teng" in the "film and television field" are determined. A music name semantic slot "Tianmimi" and a singer name semantic slot "Teresa Teng" in the "music field" are determined. The knowledge-based skill service includes a knowledge base of the film and television field and a knowledge base of the music field.

For step S12, in the case of a smart TV, the film and television skill is a first skill, and the music skill is a second skill. When the skill preferentially hit by "Play Teresa Teng's Tianmimi" is the film and television field skill, whether "Tianmimi" and "Teresa Teng" match each other is determined according to the knowledge base of the film and television field. In the disclosure above, the film title "Tianmimi" in the knowledge base of the film and television field corresponds to filmmakers: Peter Chan, Maggie Cheung, Leon Lai Ming, and Eric Tsang. Therefore, the name semantic slot does not match the character semantic slot in the film and television field.

For step S13, it is determined in step S12 that the name semantic slot does not match the character semantic slot in the film and television field, in which "Teresa Teng" does not exist in the "filmmakers" thesaurus corresponding to the film title "Tianmimi" in the knowledge base of the film and television field. Further, whether "Teresa Teng" and "Tianmimi" match each other is determined according to the knowledge base of the "music skill" field.

For step S14, in the music skill field, "Teresa Teng" matches "Tianmimi", and accordingly the music skill field is determined as the skill field of "Play Teresa Teng's Tianmimi". Then the music skill is invoked to play Teresa Teng's song Tianmimi to the user.

To make verification, a total of 2001 pieces of film and television data were randomly obtained, including 69 original bad cases, meaning an error rate of 3.4%. After introducing the above strategy, 36 cases can be effectively solved, the error rate is reduced to 1.64%, namely reduced by 52.17%.

It can be seen from this embodiment that the error rate of field classification is reduced, the skill field hit by the user's voice dialogue is more accurate, and the user experience is improved.

As an implementation, in this embodiment, when the first skill field is the film and television field, the second skill field is the music field; and when the first skill field is the music field, the second skill field is the film and television field.

In this embodiment, taking a smartphone as an example, the priority of the music skill is higher than that of the film and television skill. In the case that the two skills have the same parsing confidence, the music skill takes precedence. When the first skill field is the music field, the second skill field is the film and television field.

In this embodiment, priorities of different skills are pre-configured for different voice products, which can be adjusted freely. For smartphones, dialogues that should fall into the film and television skill can be avoided from falling into the music skill, which further improves the accuracy of a voice dialogue hitting a skill field.

As an implementation, in this embodiment, if the name semantic slot and the character semantic slot match in the knowledge base of the first skill field, the first skill field is determined as the skill field of the dialogue text.

In this embodiment, taking a smart TV as an example, when the first skill field is the film and television field, the second skill field is the music field. In the case of "Play Donnie Yen's Yip Man", if the name semantic slot and the character semantic slot match in knowledge base of the film and television field, then the film and television field is directly determined as the skill field of "Play Donnie Yen's Yip Man".

As an implementation, after determining the second skill field as the skill field of the dialogue text, the method further includes:

determining the second skill field as the skill field of the dialogue text. preferentially when the user inputs the dialogue text again.

In this embodiment, taking a smart TV as an example, if the user inputs "Play Teresa Teng's Tianmimi" for the first time, the music skill will be determined according to the determination in the above method. When the user enters "Play Teresa Teng's Tianmimi" again, no determination is needed at this time, and the music skill field is directly determined as the skill field for "Play Teresa Teng's Tianmimi", and then the music skill is invoked to play Teresa Teng's song Tianmimi to the user.

In this embodiment, for a dialogue input repeatedly, the skill field determined in history can be directly used to reply to the user, so as to improve the interaction efficiency.

FIG. 2 is a schematic structural diagram of an apparatus for determining a skill field of a dialogue text according to an embodiment of the present invention. The apparatus can execute the method for determining a skill field of a dialogue text described in any of the above embodiments, and is configured in a terminal.

The apparatus for determining a skill field of a dialogue text according to this embodiment includes an information determining program module 11, a first matching program module 12, a second matching program module 13, and a skill field determining program module 14.

The information determining program module 11 is configured to determine a skill field hit by a dialogue text input by a user, and to determine a name semantic slot and a character semantic slot in the skill field. The first matching program module 12 is configured to, when the skill field hit by the dialogue text is a first skill field, determine whether the name semantic slot and the character semantic slot match according to a knowledge base of the first skill field. The second matching program module 13 is configured to, if the name semantic slot and the character semantic slot do not match in the knowledge base of the first skill field, further determine whether the name semantic slot and the character semantic slot match according to a knowledge base of a second skill field. The skill field determining program module 14 is configured to, if the name semantic slot and the character semantic slot match in the knowledge base of the second skill field, determine the second skill field as the skill field of the dialogue text.

Further, the apparatus is further configured to:

establish in advance a knowledge base in a film and television field and a knowledge base in a music field, wherein the knowledge base in the film and television field stores information of correlation between film and television titles and filmmakers, and the knowledge base in the music field stores information of correlation between music names and singer names.

Further, when the first skill field is the film and television field, the second skill field is the music field; and when the first skill field is the music field, the second skill field is the film and television field.

Further, if the name semantic slot and the character semantic slot match in the knowledge base of the first skill field, the first skill field is determined as the skill field of the dialogue text.

Further, the apparatus is further configured to:

determine the second skill field as the skill field of the dialogue text preferentially when the user inputs the dialogue text again.

An embodiment of the present invention further provides a non-volatile computer storage medium having computer-executable instructions stored therein, in which the computer-executable instructions can execute the method for determining a skill field of a dialogue text in any of the above method embodiments.

As an implementation, the non-volatile computer storage medium according to the present invention stores computer-executable instructions which are configured to:

determine a skill field hit by a dialogue text input by a user, and determine a name semantic slot and a character semantic slot in the skill field;

determine, when the skill field hit by the dialogue text is a first skill field, whether the name semantic slot and the character semantic slot match according to a knowledge base of the first skill field;

further determine, if the name semantic slot and the character semantic slot do not match in the knowledge base of the first skill field, whether the name semantic slot and the character semantic slot match according to a knowledge base of a second skill field; and if the name semantic slot and the character semantic slot match in the knowledge base of the second skill field, determine the second skill field as the skill field of the dialogue text.

As a non-volatile computer-readable storage medium, non-volatile software programs, non-volatile computer-executable programs and modules can be stored therein, such as the program instruction/module corresponding to the method for determining a skill field of a dialogue text in the embodiments of the present invention. One or more program instructions can be stored in the non-volatile computer-readable storage medium, and perform the method for determining a skill field of a dialogue text according to any of the above method embodiments when being executed by the processors.

The non-volatile computer storage medium may include a storage program area and a storage data area. The storage program area may store an operating system and application programs required by at least one function. The storage data area may store data generated according to the use of a full-duplex voice dialogue systems and the like. In addition, the memory may include a high-speed random access memory, and may also include a non-volatile memory, such as at least one magnetic disk storage device, a flash memory device, or other non-volatile solid-state storage devices. In some embodiments, the memory may optionally include memories remotely disposed with respect to the processor, and these remote memories may be connected to a full-duplex voice dialogue through a network. Examples of the above network include but are not limited to the Internet, intranet, local area network, mobile communication network, and combinations thereof.

An embodiment of the present invention further provides an electronic device, which includes: at least one processor, and a memory communicatively coupled to the at least one processor, wherein the memory stores instructions executable by the at least one processor, and the instructions are executed by the at least one processor to enable the at least one processor to:

determine a skill field hit by a dialogue text input by a user, and a name semantic slot and a character semantic slot in the skill field;

determine, when the skill field hit by the dialogue text is a first skill field, whether the name semantic slot and the character semantic slot match according to a knowledge base of the first skill field;

further determine, if the name semantic slot and the character semantic slot do not match in the knowledge base of the first skill field, whether the name semantic slot and the character semantic slot match according to a knowledge base of a second skill field; and if the name semantic slot and the character semantic slot match in the knowledge base of the second skill field, determine the second skill field as the skill field of the dialogue text.

In some embodiments, the processor is further configured to establish in advance a knowledge base in a film and television field and a knowledge base in a music field, wherein the knowledge base in the film and television field stores information of correlation between film and television titles and filmmakers, and the knowledge base in the music field stores information of correlation between music names and singer names.

In some embodiments, when the first skill field is the film and television field, the second skill field is the music field; and when the first skill field is the music field, the second skill field is the film and television field.

In some embodiments, the processor is further configured to determine the first skill field as the skill field of the dialogue text if the name semantic slot and the character semantic slot match in the knowledge base of the first skill field.

In some embodiments, the processor is further configured to, after determining the second skill field as the skill field of the dialogue text, preferentially determining the second skill field as the skill field of the dialogue text when the user inputs the dialogue text again.

Figure 3:
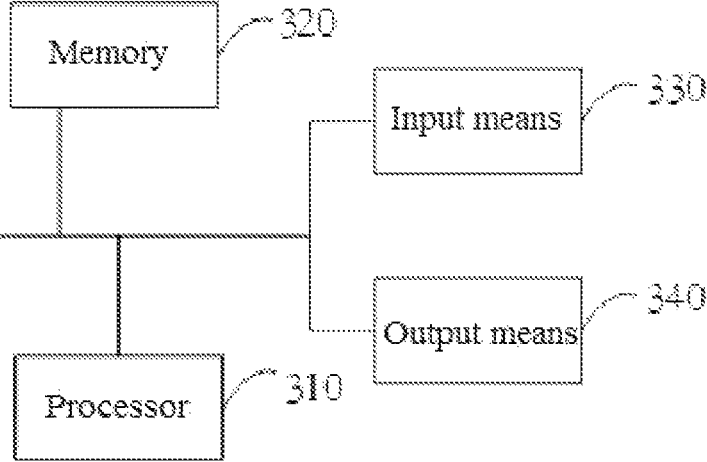
FIG. 3 is a schematic structural diagram of an electronic device according to an embodiment of the present invention.

FIG. 3 is a schematic diagram of a hardware structure of an electronic device for performing a method for determining a skill field of a dialogue text according to another embodiment of the present invention. As shown in FIG. 3, the device includes:

one or more processors 310 and a memory 320, in which one processor 310 is taken as an example in FIG. 3.

The device for performing a method for determining a skill field of a dialogue text may further include an input means 330 and an output means 340.

The processor 310, the memory 320, the input means 330, and the output means 340 may be connected by a bus or in other ways, and the connection by a bus is taken as an example in FIG. 3.

As a non-volatile computer-readable storage medium, the memory 320 may store non-volatile software programs, non-volatile computer-executable programs and modules, such as the program instruction/module corresponding to the method for determining a skill field of a dialogue text in the embodiments of the present invention. The processor 310 executes various functional applications and data processing of a server by running the non-volatile software programs, instructions and modules stored in the memory 320, that is, to realize the method for determining a skill field of a dialogue text in the above embodiments.

The memory 320 may include a stored program area and a stored data area. The stored program area may store an operating system, an application program required for at least one function. The stored data area may store data created according to the use of the method for determining a skill field of a dialogue text, and the like. Additionally, the memory 320 may include high speed random access memory and nonvolatile memory, such as at least one magnetic disk storage device, flash memory device, or other nonvolatile solid state storage device. In some embodiments, the memory 320 may include a memory located remotely relative to the processor 310 and connected to the method for determining a skill field of a dialogue text through a network. Examples of such networks include, but are not limited to, the Internet, an intranet, a local area network, a mobile communication network, and combinations thereof.

The input means 330 may receive input numerical or character information, and generate signals related to user settings and function control of the method for determining a skill field of a dialogue text. The output means 340 may include a display device such as a display screen.

The memory 320 stores one or more modules, which, when being executed by the one or more processors 310, perform the method for determining a skill field of a dialogue text in any of the above method embodiments.

The electronic devices in the embodiments of the present application may be in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices; and (4) Other electronic devices with data interaction function.

In this description, wordings like first and second are merely for separating one entity or operation from the other, but not intended to require or imply a relation or sequence among these entities or operations. Further, it should be noted that in this specification, terms such as "comprised of" and "comprising" shall mean that not only those elements described thereafter, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

The embodiments of devices described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

It should be noted that the above embodiments are merely intended to illustrate the technical solutions of the present invention, rather than limiting them. Those skilled in the art may modify the technical solutions described in the above embodiments, or replace some of the technical features therein. These modifications or substitutions do not make the essence of the corresponding technical solutions depart from the spirit and scope of the technical solutions of the embodiments of the present invention.

What is claimed is:

1. A method for determining a skill field of a dialogue text, applied to an electronic device, the method comprising:

scheduling, by the electronic device, a task-based skill semantic service and a knowledge-based skill service in parallel to determine a skill field hit by a dialogue text input by a user, a name semantic slot and a character semantic slot in the skill field, wherein the skill field comprises a first skill field and a second skill field, and the first skill field and the second skill field have the same parsing confidence, wherein, when the electronic device is a TV, the first skill field is a film and television field, the second skill field is a music field, and when the electronic device is a smartphone, the first skill field is the music field, the second skill field is the film and television field;

determining, by the electronic device, whether the name semantic slot and the character semantic slot corresponding to the first skill field match according to a knowledge base of the first skill field;

further determining, by the electronic device, whether the name semantic slot and the character semantic slot corresponding to the second skill field match according to a knowledge base of a second skill field, if the name semantic slot and the character semantic slot corresponding to the first skill field do not match in the knowledge base of the first skill field; and determining, by the electronic device, the second skill field as the skill field of the dialogue text, if the name semantic slot and the character semantic slot corresponding to the second skill field match in the knowledge base of the second skill field, and responding to the user using a skill of the determined skill field of the dialogue text, the method further comprising:

establishing in advance a knowledge base in the film and television field and a knowledge base in the music field, wherein the knowledge base in the film and television field stores information of correlation between film and television titles and filmmakers, and the knowledge base in the music field stores information of correlation between music names and singer names.

2. The method according to claim 1, wherein if the name semantic slot and the character semantic slot corresponding to the first skill field match in the knowledge base of the first skill field, the first skill field is determined as the skill field of the dialogue text.

3. The method according to claim 1, wherein after determining the second skill field as the skill field of the dialogue text, the method further comprises:

preferentially determining the second skill field as the skill field of the dialogue text when the user inputs the dialogue text again.

4. An electronic device comprising at least one processor, and a memory communicatively coupled to at least one processor, wherein the memory stores instructions readable and executable by the at least one processor, the instructions being executed by the at least one processor to enable the at least one processor to perform the steps of the method of claim 1.

5. A non-transitory computer-readable storage medium having stored therein a computer program, wherein the computer program, when executed by a processor, implements the steps of the method of claim 1.

* * * * *